(12) United States Patent
Park et al.

(10) Patent No.: US 8,732,404 B2
(45) Date of Patent: May 20, 2014

(54) METHOD AND APPARATUS FOR MANAGING BUFFER CACHE TO PERFORM PAGE REPLACEMENT BY USING REFERENCE TIME INFORMATION REGARDING TIME AT WHICH PAGE IS REFERRED TO

(75) Inventors: Jang Woo Park, Seoul (KR); Sang-Won Lee, Suwon-si (KR)

(73) Assignee: Altibase Corp., Seoul (KR)

( * ) Notice: Subject to any disclaimer, the term of this patent is extended or adjusted under 35 U.S.C. 154(b) by 258 days.

(21) Appl. No.: 13/433,056

(22) Filed: Mar. 28, 2012

(65) Prior Publication Data
US 2013/0262742 A1   Oct. 3, 2013

(51) Int. Cl.
*G06F 12/12* (2006.01)
*G06F 12/02* (2006.01)
*G06F 9/34* (2006.01)

(52) U.S. Cl.
CPC .......... *G06F 12/123* (2013.01); *G06F 12/0246* (2013.01); *G06F 9/342* (2013.01)
USPC ............................ 711/136; 711/103; 711/133

(58) Field of Classification Search
CPC .... G06F 12/123; G06F 12/0246; G06F 9/342
USPC .......................................... 711/103, 133, 136
See application file for complete search history.

(56) References Cited

U.S. PATENT DOCUMENTS

| | | | |
|---|---|---|---|
| 2011/0173395 A1* | 7/2011 | Bhattacharjee et al. | 711/135 |
| 2012/0072652 A1* | 3/2012 | Celis et al. | 711/103 |
| 2012/0215752 A1* | 8/2012 | Parkkinen et al. | 707/705 |

* cited by examiner

*Primary Examiner* — Than Nguyen
(74) *Attorney, Agent, or Firm* — Fenwick & West LLP

(57) ABSTRACT

A method and apparatus manages a buffer cache. An extended buffer is used to perform a page replacement algorithm using reference time information regarding a time at which a page is referred. Pages replaced through the page replacement algorithm, when re-referred to, may be retrieved from the extended buffer, instead of a hard disk. As a result, write/read operations with respect to the disk are made efficient and the page input/output speed is increased.

20 Claims, 7 Drawing Sheets

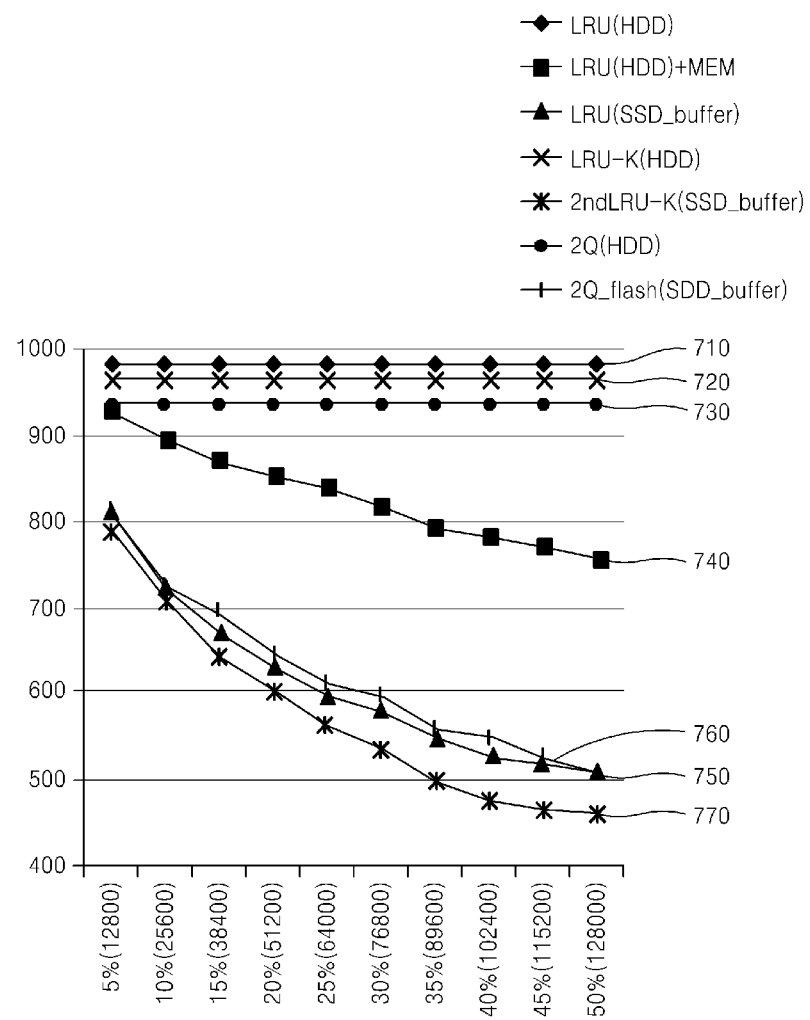

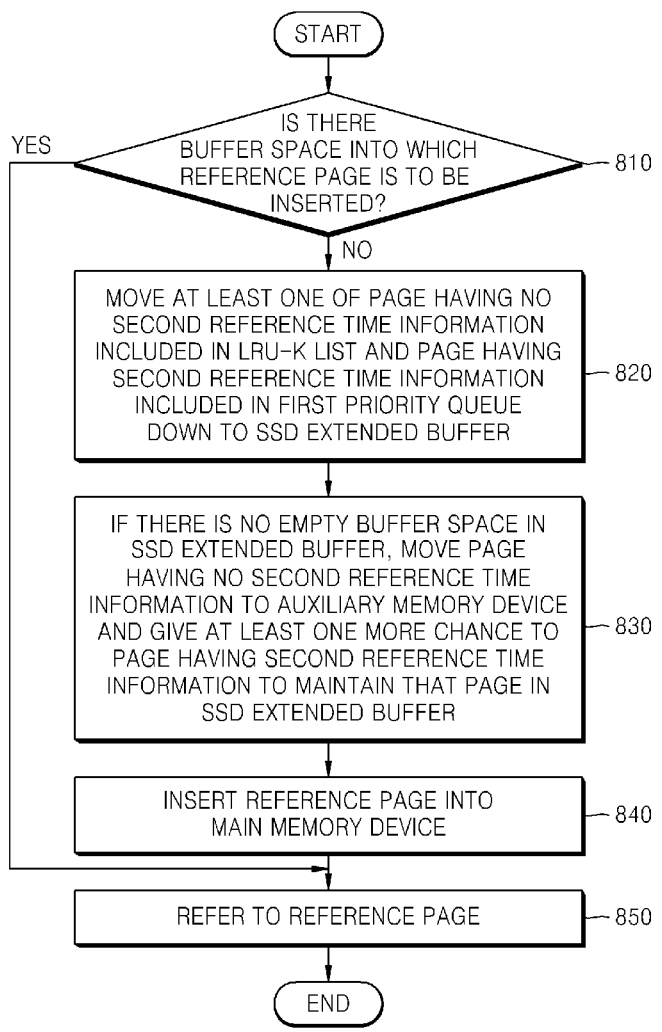

METHOD AND APPARATUS FOR MANAGING BUFFER CACHE TO PERFORM PAGE REPLACEMENT BY USING REFERENCE TIME INFORMATION REGARDING TIME AT WHICH PAGE IS REFERRED TO

BACKGROUND OF THE INVENTION

1. Field of the Invention

The present invention relates to managing a buffer cache, and more particularly, to managing a buffer cache which uses an extended buffer to perform a page replacement algorithm using information regarding a time at which a page is referred to.

2. Description of the Related Art

Since components included in a digital terminal such as a computer, e.g., a central processing unit (CPU), a memory, a hard disk, a compact disc (CD)-read only memory (CD-ROM), and so forth have different data processing speeds, they cannot operate at the same speed in data input/output operations. Therefore, if an imbalance between the data processing speeds of the components included in the terminal is not corrected, the overall data processing speed of the digital terminal may be reduced.

As a hardware solution to such a problem, a buffer or cache for covering an input/output speed difference between components of the terminal may be used. The buffer or cache reduces the bottlenecks caused by a speed difference between components of the terminal, that is, a phenomenon where a component which processes data at a high speed waits for completion of an operation by a component which processes data at a low speed.

A page replacement policy using a buffer cache for improving a data processing speed has evolved into various algorithms, and many algorithms have been researched to determine whether to maintain a particular page in the buffer cache or move that page down to a hard disk for rapid input/output of the page.

There are various types of page replacement algorithms using a buffer cache, such as Least Recently Used (LRU), 2Q, Early Eviction Least Recently Used (EELRU), Least Recently/Frequency Used (LRFU), Unified Buffer Management (UBM), and the like.

An LRU-K algorithm, one of the page replacement algorithms, determines a block to be replaced, based on reference density estimated from recent K references. That is, a block of which a last kth reference time is oldest among blocks in the buffer cache is replaced. Since the last kth reference time is considered, the LRU-K replacement policy can distinguish frequently referred blocks from infrequently referred blocks, such that blocks which have been recently referred to a small number of times may be preferentially replaced in the buffer cache.

For K=2, to use the LRU-K algorithm, the last reference time of a page and last-preceding reference time information, which is time information immediately preceding the last reference time, are maintained in a header of a buffer, and such reference time information has to be updated each time the page included in the buffer is referred to.

When a particular page is referred to in an auxiliary memory device such as a hard disk and moves up to a main memory device, last reference time information of the particular page is updated, and then when the particular page is referred to in the main memory device again, the last reference time information is recorded as reference time preceding the last reference time and time at which the page was referred to in the main memory device is updated as the last reference time.

When a page replacement policy using a conventional LRU-K algorithm is used, because of limited space in memory, even a page that has been previously referenced may be pushed out of the LRU-K list and recorded in an auxiliary memory device in certain situations. As a result, if such a page is referred to again in a running program, that page has to be read again from the auxiliary memory device, causing additional write/read operations with respect to a disk and thus a delay in data processing time.

SUMMARY OF THE INVENTION

Methods, systems, and computer program products provide for management of a buffer cache to improve a data processing time by using an extended buffer in implementing a page replacement policy using reference time information regarding a time at which a page is referred to. According to an embodiment, a buffer cache is managed to perform page replacement by using reference time information regarding a time at which a page is referred to. A reference page to be referred to is loaded according to a request in a main memory. If a space for loading the reference page is insufficient in the main memory, at least one first page is selected based on reference time information of pages loaded in the main memory. The selected first page is recorded in an extended buffer, and the reference page is stored in a space where the selected first page has existed in the main memory. If a space for recording the selected first page is insufficient in the extended buffer, at least one second page is selected based on reference time information of pages recorded in the extended buffer. The selected second page is recorded in an auxiliary memory, and the reference page is stored in a space where the selected second page has existed in the extended buffer.

BRIEF DESCRIPTION OF THE DRAWINGS

The above and other features and advantages of the present invention will become more apparent by describing in detail an exemplary embodiment thereof with reference to the attached drawings in which:

FIG. 7 shows graphs of performance when an SSD is used as an extended buffer in an LRU-K page replacement algorithm, according to an embodiment of the present invention; and FIG. 8 is a simplified flowchart of a method for implementing an LRU-K page replacement algorithm using an SSD extended buffer, according to an embodiment of the present invention.

DETAILED DESCRIPTION OF THE INVENTION

Figure 1:
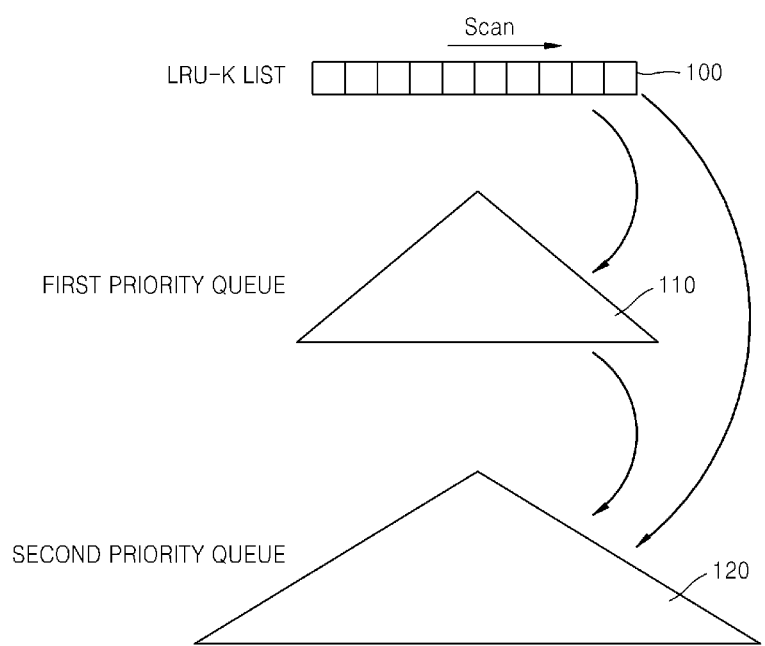
FIG. 1 is a conceptual diagram for describing an LRU-K algorithm among page replacement algorithms for operating a buffer cache.

Various changes may be made to the invention, and the invention may have various forms, such that exemplary embodiments will be illustrated in the drawings and described in detail. However, such an embodiment is not intended to limit the invention to the disclosed exemplary embodiment and it should be understood that the embodiment include all changes, equivalents, and substitutes within the spirit and scope of the invention. Throughout the drawings, like reference numerals refer to like components.

As used herein, terms such as "first," "second," etc. are used to describe various components. However, it is obvious that the components should not be defined by these terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

When it is mentioned that a component is "connected" to or "accessed" by another component, it may be understood that the component is directly connected to or accessed by the other component or that still other component is interposed between the two components. On the other hand, when it is mentioned that a component is "directly connected to" or "directly accessed by" another component, it may be understood that no component is interposed therebetween.

The terminology used herein is for the purpose of describing an embodiment only and is not intended to be limiting of an exemplary embodiment. As used herein, the singular forms are intended to include the plural forms as well, unless the context clearly indicates otherwise. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

Hereinafter, an exemplary embodiment of the present invention will be described in more detail with reference to the accompanying drawings. Like components will be referred to as like reference numerals throughout the drawings, and a repetitive description thereof will be avoided.

Hereinafter, in an embodiment of the present invention, an LRU-K algorithm is used as a page replacement algorithm. For convenience's sake, a page replacement policy may be applied on an assumption that K is 2. However, without departing from the essence of the present invention, an applicable page replacement algorithm is not limited to an LRU-K algorithm, and even when the LRU-K algorithm is applied, K may be, without being limited to, 2 or a larger value. In the following description, K is assumed to be 2 and when a particular page is referred to, a time information regarding the most recently referred time of the page is defined as last reference time information, and referred time prior to the most recently referred time of the page is defined as last-preceding reference time information. In an embodiment of the present invention, the last reference time information will be indicated as first reference time information and the last-preceding reference time information will be indicated as second reference time information.

To apply an LRU-K algorithm to respective pages, the pages are classified as hot pages, warm pages, and cold pages according to their attributes; the hot pages are defined as pages which currently exist in a main memory, the warm pages are defined as pages which have both last-preceding reference time information (second reference time information) and last reference time information (first reference time information), and the cold pages are defined as pages which have only last reference time information (first reference time information) but no last-preceding reference time information (second reference time information) and pages which have no reference time information.

According to an embodiment of the present invention, in implementing an LRU-K algorithm for operating a buffer cache, when a particular page is referred to, and if the referred page exists in an LRU-K list, the particular page referred to in the LRU-K list may be moved to a header of the LRU-K list. If the particular page of the LRU-K list is referred to, reference time information of the referred page changes, such that the LRU-K list may be rearranged.

In the case of K=2, if there is no space for recording a reference page in the LRU-K list, the LRU-K list is sequentially scanned to search for a victim page. The victim page may be a page which exists in the LRU-K list and has no last-preceding reference time information. During scanning of the LRU-K list, a page having last-preceding reference time information is inserted into the first priority queue and a page having no last-preceding reference time information is maintained in the LRU-K list. Upon completion of the scanning, a page having no last-preceding reference time information may be designated as a victim page.

If all pages encountered during the scanning of the LRU-K list have a last-preceding reference time information, a page having the oldest last-preceding reference time information among pages which have been pushed to the first priority queue because of having respective last-preceding reference time information during the scanning is designated as a victim page.

The second priority queue may be used to determine a page to be pushed if a pushed page is inserted into the LRU-K list 100 again, by recording reference time information of pages pushed out of the LRU-K list 100.

FIG. 1 is a conceptual diagram for describing the data structures used by an LRU-K algorithm which is a page replacement algorithm for operating a buffer cache according to an embodiment. Referring to FIG. 1, to implement an LRU-K algorithm, which is a page replacement algorithm, an LRU-K list 100, a first priority queue 110, and a second priority queue 120 are used. When a particular page is referred to and the referred page exists in the LRU-K list 100, the page referred in the LRU-K list 100 is moved to a header of the LRU-K list 100. If a particular page of the LRU-K list 100 is referred to, pages included in the LRU-K list 100 may be rearranged because reference time information of the referred page changes.

When K is 2 and there is no space for recording a page to be referred to (or reference page) in the LRU-K list 100, the LRU-K list 100 may be sequentially scanned to search for a victim page. The victim page may be a page which exists in the LRU-K list 100 and has no last-preceding reference time information.

During scanning of the LRU-K list 100, a page having last-preceding reference time information is inserted into the first priority queue 110 and a page having no last-preceding reference time information is maintained in the LRU-K list

100. Upon completion of the scanning, a page having no last-preceding reference time information is designated as a victim page and inserted into the auxiliary memory device, and a reference page is inserted into the header of the LRU-K list 100.

If all pages encountered during the scanning of the LRU-K list 100 have last-preceding reference time information, a page having the oldest last-preceding reference time information among pages which have been pushed to the first priority queue 110 is designated as a victim page and is recorded in the auxiliary memory device, and the corresponding reference page is inserted into the first priority queue 110. The second priority queue 120 may be used to determine a page to be pushed if a page previously pushed out is inserted into the LRU-K list 100 again, by recording reference time information of pages pushed out of the LRU-K list 100.

By using a method of recording a page which is pushed out of the LRU-K list and the first priority queue in an SSD, the speed of data input/output can be improved when compared to a conventional LRU-K algorithm.

According to an embodiment of the present invention, an SSD may be used as an extended buffer for maintaining a warm page pushed from the LRU-K list by giving an additional chance to the warm page without moving down the warm page to an auxiliary memory device such as a hard disk. The SSD is a kind of flash memory that has superior performance over a hard disk having a general magnetic nature, in terms of random read.

However, unlike a hard disk drive (HDD), the SSD, because it uses a NAND, cannot perform an overwrite operation. As a result, when a page has to be overwritten to the SSD, the remaining pages of a block, except for a page to be overwritten, are copied to a free block which has no recorded page, and then the page to be overwritten is overwritten in a corresponding position. A previous data block is converted into a free block through an erase operation. Due to the foregoing complex procedure, the SSD has slower data processing than the hard disk, which can immediately overwrite a corresponding page if necessary.

As an approach to solve the SSD's problem in overwriting, areas of the SSD may be divided into a log area and a data area. The data area is an area in which actual data is stored, and the log area may be used to postpone an erase operation resulting from overwriting to the data area.

Figure 2:
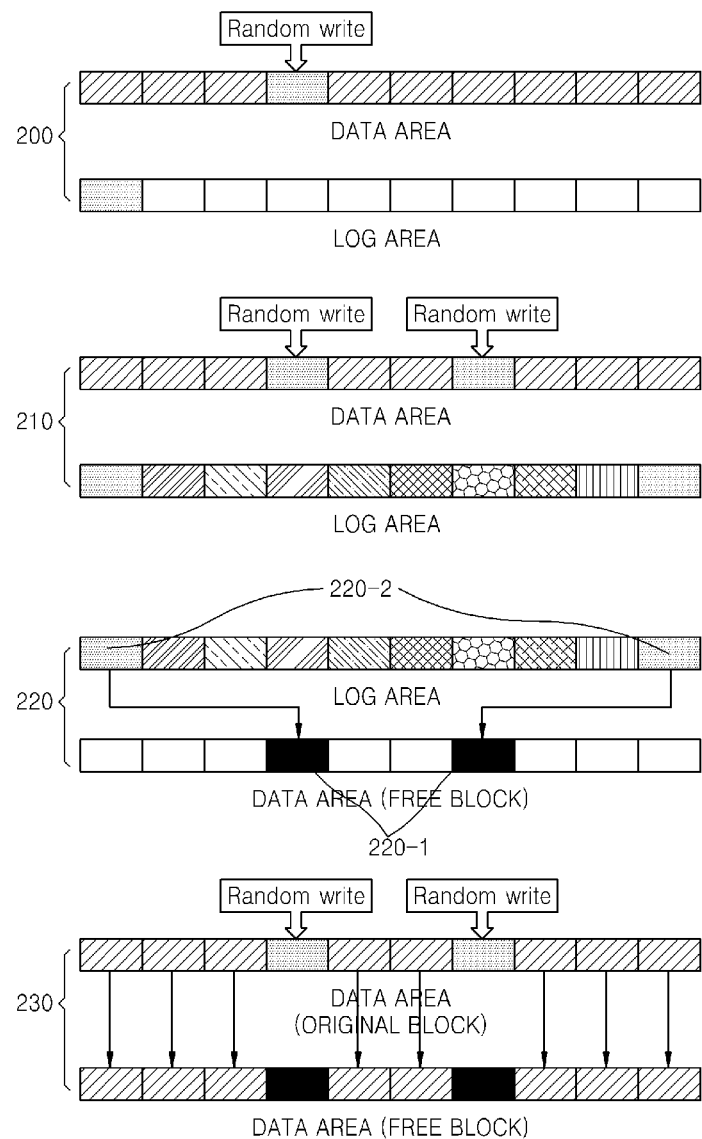
FIG. 2 is a conceptual diagram showing a method for executing a random write on a particular page by using a data area and a log area in a solid-state disk (SSD)

FIG. 2 is a conceptual diagram showing a method for executing a random write on a particular page by using a data area and a log area in an SSD. Referring to FIG. 2, in a random write step 1 200, if a random write has to be performed on a particular page included in the data area of the SSD, the particular page which has to be random-written is made invalid and then the particular page to be updated is recorded in the log area of the SSD.

In a random write step 2 210, pages of respective blocks of the data area, which have to be updated through a random write due to the need for a continuous random write, may fully fill up a log area of the SSD.

Next, in a random write step 3 220, free blocks 220-1 of the data area, which have no stored pages, are allocated and a page 220-2 of a block to be merged among pages recorded in the log area is copied to a position of a page to be random-written in the free block 220-1.

In a random write step 4 230, the remaining blocks in the original data blocks, which do not have to be updated, are copied to free blocks. Both the random write step 3 220 and the random write step 4 230 are performed on pages to be updated in the log area. That is, in the SSD, a time for performing an erase operation due to an overwrite operation to the data area is delayed by using the log area, thereby improving the slow overwrite operation.

According to an embodiment of the present invention, to solve a problem that an SSD extended buffer immediately returns warm data generated when using an LRU-K algorithm to a hard disk and thus data input/output speed is lowered due to additional input/output operations in the case of page re-reference, the warm data may be stored in the SSD by giving an additional chance to the SSD. To store warm data by using the SSD as an extended buffer, the SSD, during an overwrite operation, needs to perform only a sequential write without having to perform a random write described with reference to FIG. 2, improving overwrite speed.

Figure 3:
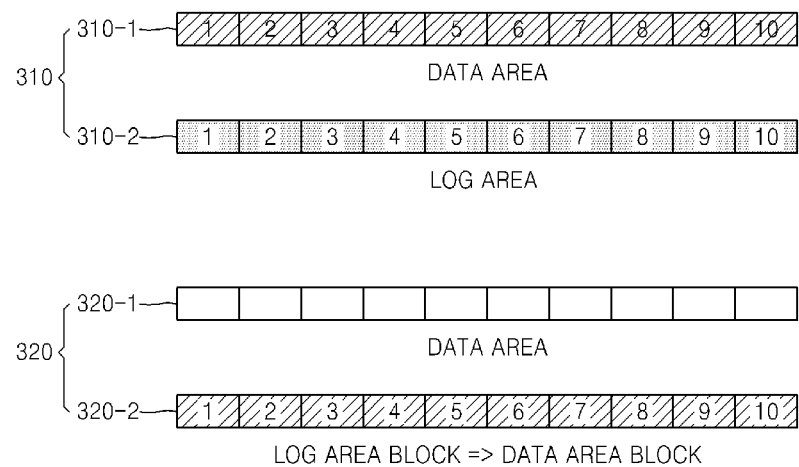
FIG. 3 is a conceptual diagram for describing a sequential write with respect to an SSD to use the SSD as an extended buffer, according to an embodiment of the present invention.

FIG. 3 is a conceptual diagram for describing a sequential write with respect to the SSD to use the SSD as an extended buffer, according to an embodiment of the present invention. Referring to FIG. 3, pages pushed from an LRU-K list may be sequentially recorded in a log area and a data area of an SSD extended buffer.

In a sequential write step 1 310, the pages pushed from the LRU-K list are sequentially recorded in a data area 310-1 of the SSD extended buffer, and after the data area 310-1 is filled up, they are sequentially recorded in a log area 310-2 through an overwrite operation. In a sequential write step 2 320, log area blocks 320-2 where the overwrite operation occurs are directly switched to data area blocks without a merge operation, and previous data area blocks 320-1 may be overwritten by performing an erase operation. That is, the sequential write operation with respect to the SSD used as the extended buffer in the present invention can be simply executed, without an additional erase operation and a page copy operation, when compared to a random write operation, thereby improving overwrite speed.

Figure 4:
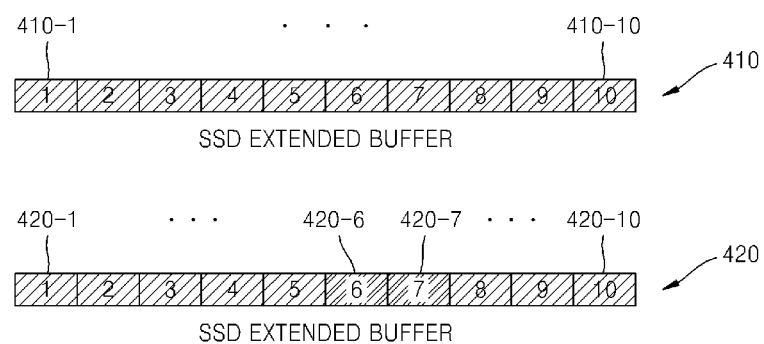
FIG. 4 is a conceptual diagram showing an example of using an SSD as an extended buffer with a circular queue structure, according to an embodiment of the present invention.

FIG. 4 is a conceptual diagram showing an example of using the SSD as the extended buffer with a circular queue structure, according to an embodiment of the present invention.

If, in the SSD extended buffer, there is no empty buffer space on which a page pushed from the LRU-K list or a page pushed from the first priority queue are to be recorded, a page existing in the SSD extended buffer is recorded in the hard disk and a page newly pushed from the LRU-K list or the first priority queue may be recorded in the SSD extended buffer. The page pushed from the first priority queue may be a warm page in which last-preceding reference time information (second reference time information) is recorded, and the page pushed from the LRU-K list may be a cold page having only last reference time information (first reference time information).

A first SSD extended buffer 410 shows a state when only cold pages exist in the SSD extended buffer. For example, in the first SSD extended buffer 410, when the cold pages pushed from the LRU-K list are recorded from a first buffer 410-1 to a tenth buffer 410-10, such that the SSD extended buffer is filled up, the page existing in the first buffer 410-1 is recorded in the hard disk and a page newly pushed from the LRU-K list may be recorded in the first buffer 410-1.

A second SSD extended buffer 420 shows a state when not only the cold pages but also warm pages 420-6 and 420-7 having first reference time information and second reference time information, which have been pushed from a first priority queue, exist in the SSD extended buffer.

According to an embodiment of the present invention, in the present invention, the warm pages 420-6 and 420-7, unlike cold pages, are given one more chance, instead of being directly recorded in the hard disk even when the SSD extended buffer is fully filled up, so that they may be maintained in the SSD extended buffer one more time. By giving one additional chance to the warm pages 420-6 and 420-7 to maintain them in the SSD extended buffer, a hit rate of the SSD extended buffer for the warm pages 420-6 and 420-7 may be increased and the number of read/write operations with respect to the hard disk for the warm pages 420-6 and 420-7 may be reduced.

The number of times the warm pages 420-6 and 420-7 are given a chance to be maintained in the SSD extended buffer is adjustable. That is, as stated previously, one more chance is given to the warm pages 420-6 and 420-7, after which if blocks in which the warm pages 420-6 and 420-7 exist through a sequential write are to be overwritten, the warm pages 420-6 and 420-7 may be moved down to the hard disk, or according to circumstances, the number of times the warm pages 420-6 and 420-7 are given a chance to be maintained in the SSD extended buffer may be adjusted to be one or more.

Figure 5:
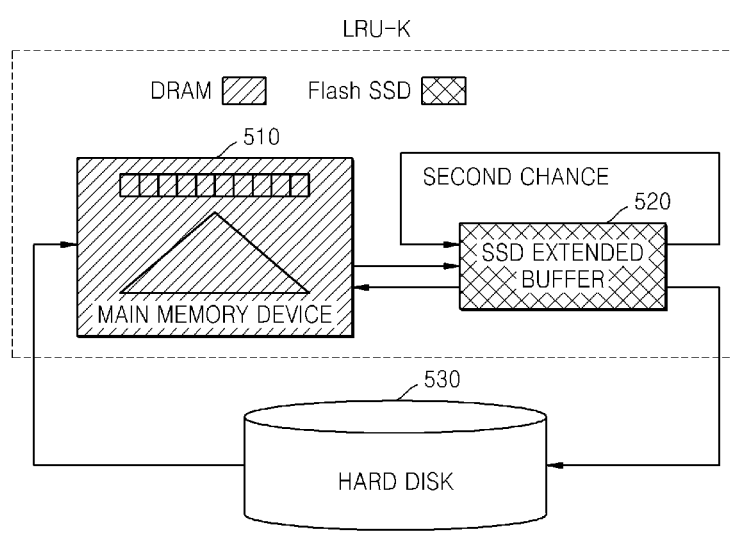
FIG. 5 is a conceptual diagram showing a device which uses an SSD as an extended buffer, according to an embodiment of the present invention.

FIG. 5 is a conceptual diagram showing a device which uses an SSD as an extended buffer, according to an embodiment of the present invention.

Referring to FIG. 5, the device using an SSD extended buffer 520 may include a main memory device 510, the SSD extended buffer 520, and a hard disk 530.

The main memory device 510 may be implemented with a dynamic random access memory (DRAM). The main memory device 510 may include reference pages moved up from the hard disk 530 and pages moved up from the SSD extended buffer 520. The main memory device 510 may include an LRU-K list using an LRU-K page replacement algorithm, a first priority queue, and a second priority queue; the LRU-K list may include hot pages having first reference time information; the first priority queue includes warm pages having first reference time information and second reference time information; and the second priority queue may store reference time information of pages pushed to and recorded in the hard disk 530.

A page (first page) pushed from the main memory device 510 may be recorded in the SSD extended buffer 520. The SSD extended buffer 520 may be implemented with an SSD. Cold pages or warm pages, which are pushed from the LRU-K list or the first priority queue of the main memory device 510, may be recorded in the SSD extended buffer 520. The SSD extended buffer 520 may be divided into a data area and a log area, and the pages pushed from the main memory device 510 may be recorded in the SSD extended buffer 520 through a sequential write.

Cold pages having first reference time information, which is last reference time information, included in the SSD extended buffer 520 may be sequentially pushed to and recorded in the hard disk 530 through an overwrite operation, if a buffer space for recording a page pushed from the LRU-K list of the main memory device 510 is insufficient in the SSD extended buffer 520. That is, a page newly pushed from the main memory device 510, may be overwritten in a space where a cold page has existed in the SSD extended buffer 520.

However, the warm pages pushed from the first priority queue included in the SSD extended buffer 520 may be given an additional chance to be maintained in the SSD extended buffer 520, instead of being pushed to and recorded in the hard disk 530. By giving one more chance to maintain the warm page in the SSD extended buffer 520, a hit rate for the warm page may be increased and the number of read/write operations with respect to the hard disk for the warm page may be reduced.

According to an embodiment of the present invention, after being given a chance to be maintained in the SSD extended buffer 520, a warm page, like a cold page, may be pushed down to a hard disk if overwrite occurs later, but according to circumstances, the number of times of giving a chance to be maintained in the SSD extended buffer 520 may be adjusted to give one or more chances.

The hard disk 530 may record a page (second page) which is pushed from the SSD extended buffer 520, or if there is a reference page necessary for the main memory device 510, may directly provide the necessary reference page to the main memory device 510.

Figure 6:
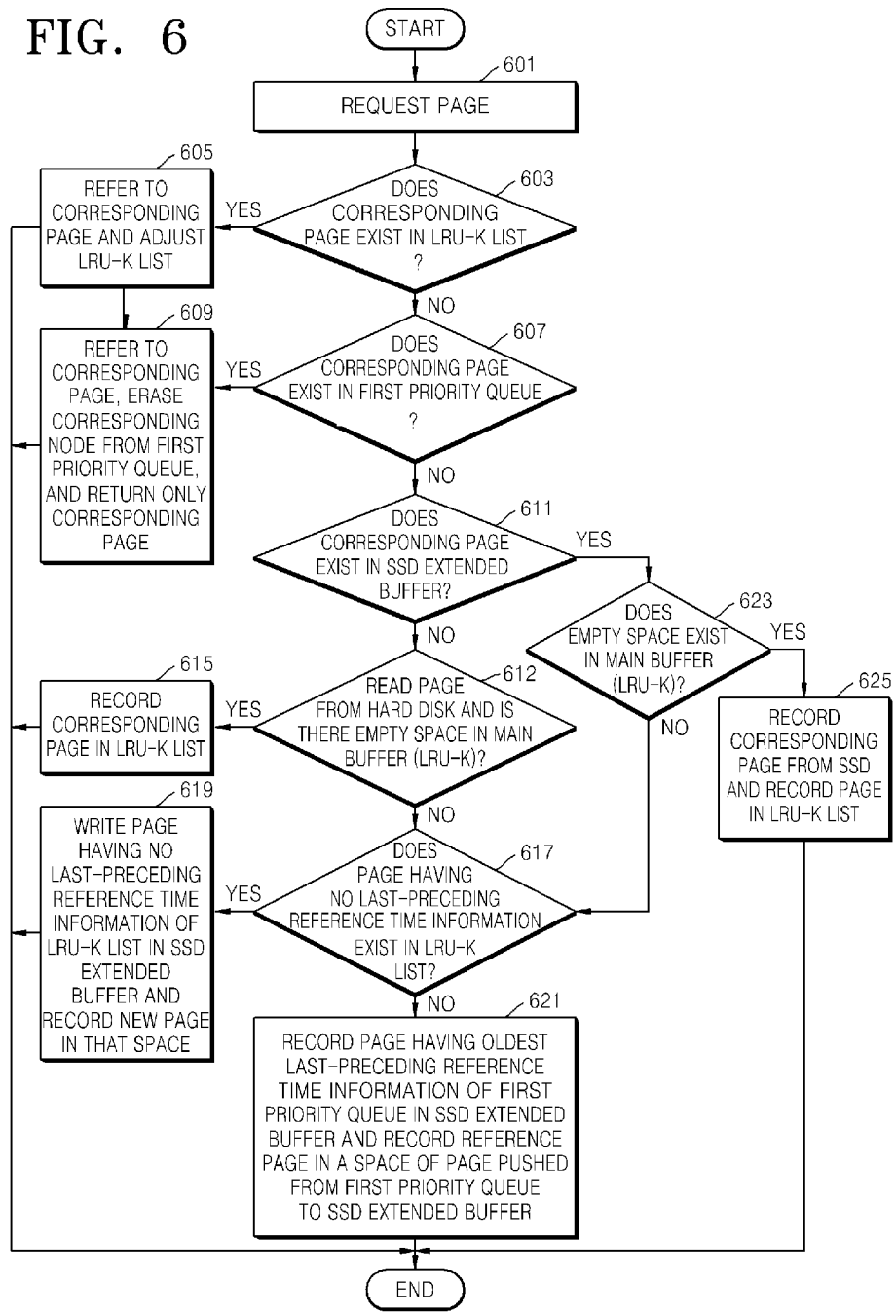
FIG. 6 is a flowchart of a page replacement method using an SSD extended buffer, according to an embodiment of the present invention.

FIG. 6 is a flowchart of a page replacement method using an SSD extended buffer, according to an embodiment of the present invention.

Referring to FIG. 6, a necessary page is requested from a CPU in operation 601. If there is a page to be referred to by a particular program, the CPU may issue a command for requesting a necessary page during execution of the program.

After the page is requested from the CPU, it is determined whether the requested page is included in an LRU-K list (or an LRU list) in operation 603. To this end, first, an LRU-K list existing in a main memory device may be checked to determine whether the requested page exists therein.

If the requested page exists in the LRU-K list, that page is referred to and the LRU-K list is adjusted in operation 605. When the page is referred to, last reference time information (first reference time information) and last-preceding reference time information (second reference time information) of the referred page in the LRU-K list are changed, such that the LRU-K list may be rearranged according to the changed time information after the page is referred to.

Otherwise, if the requested page does not exist in the LRU-K list, it is determined whether the requested page exists in the first priority queue in operation 607.

When the LRU-K algorithm is used, during the scanning of the LRU-K list, a page having last-preceding reference time information (second reference time information) may be pushed to and recorded in the first priority queue from the LRU-K list.

The LRU-K list may store hot pages having no last-preceding reference time information and a page referred to and moved up from the auxiliary memory device, such that the most recently referred page may exist in the LRU-K list.

Next, the first priority queue in which warm pages pushed from the LRU-K have been recorded is searched to determine if the requested page exists therein in operation 607. If the requested page to be referred to exists in the first priority queue, that page is referred to, a node corresponding to that page is removed from the first priority queue, and that page is returned to the LRU-K list in operation 609. Otherwise, if the requested page does not exist in the first priority queue, it is determined whether that page exists in the SSD extended buffer in operation 611.

The LRU-K list of the main memory or pages pushed from the first priority queue may be sequentially recorded in the SSD extended buffer, and it may be determined whether the corresponding page exists in the SSD extended buffer. If the requested page does not exist in the SSD extended buffer, that page is read from the auxiliary memory device such as a hard disk and it is determined whether there is an empty buffer space for storing that page in the LRU-K list to refer to that page, in operation 612. Otherwise, if the buffer space for storing the page exists in the LRU-K list, the page is inserted into the LRU-K list in operation 615.

If there is no empty buffer space for storing the page in the LRU-K list, it is determined whether a page having no last-preceding reference time information (second reference time information) exists in the LRU-K list in operation 617.

In the LRU-K page replacement algorithm, a page which is first designated as a victim page and thus pushed from the LRU-K list is a page having no last-preceding reference time information (second reference time information) in the LRU-K list, and a page which is next designated as a victim page and thus pushed from the LRU-K list is a page having the oldest last-preceding reference time information (second reference time information) in the first priority queue. Consequently, to designate the first victim page, first, it may be determined whether a page having no last-preceding reference time information (second reference time information) exists in the LRU-K list.

If a page having no last-preceding reference time information exists in the LRU-K list, that page is pushed and recorded in the SSD extended buffer, and the corresponding page is written in a buffer space left after the page having no last-preceding reference time information is pushed therefrom, in operation 619.

If all pages are determined to have a last-preceding reference time information, a page having the oldest last-preceding reference time information among pages pushed from the LRU-K list to the first priority queue during the scanning is designated as a victim page, and thus pushed to and recorded in the SSD extended buffer. The pages pushed from the first priority queue are warm pages having last-preceding reference time information, and according to an embodiment of the present invention, warm pages may be given an additional chance not to be pushed to the hard disk when overwrite occurs due to occurrence of sequential write in the SSD extended buffer. The page to be referred to is recorded in a space left after the warm page is pushed from the first priority queue to the SSD extended buffer, in operation 621.

If it is determined in operation 611 that the requested page exists in the SSD extended buffer, it is determined whether an empty buffer space exists in the LRU-K list in operation 623. If it is determined in operation 623 that there is no empty space in the LRU-K list, the process may go back to operation 617 to perform the preceding procedure. Otherwise, if it is determined in operation 623 that there is an empty space in the LRU-K list, then the requested page is read from the SSD extended buffer and inserted into the empty buffer space of the LRU-K list in operation 625.

FIG. 7 shows graphs of performance when an SSD is used as an extended buffer in an LRU-K page replacement algorithm, according to an embodiment of the present invention.

The graphs shown in FIG. 7 compare results of a TPC-C (The Transaction Processing Performance Council benchmarks C) test. The TPC-C test measures data processing performance by using a workload value of online transaction processing (OLTP), i.e., a workload value generated in online electronic commerce. The results of the TPC-C test are made based on a business model generated in electronic commerce, in which five types of business transactions, New Order, Payment, Order Status, Delivery, and Stock Level, are generated at a predetermined ratio therebetween and the number of transactions processed per minute in a steady state is calculated.

The graphs shown in FIG. 7 are graphs based on a test using 1 gigabyte as a workload. The graphs include graphs 710, 720, and 730 which use an LRU algorithm, an LRU-K algorithm, and a 2Q algorithm as page replacement algorithms only with a conventional HDD, respectively, a graph 740 which measures processing time by increasing the capacity of a RAM by a cost of an SSD extended buffer to be used in the LRU algorithm, a graph 750 for a case where an LRU algorithm is used and an SSD is used as an extended buffer, a graph 760 for a case where a 2Q algorithm is used and an SSD is used as an extended buffer, and a graph 770 for a case where an LRU-K algorithm is used and an SSD is used as an extended buffer.

In the graphs, the horizontal axis indicates the size of an SSD extended buffer with respect to the size of a database, and the vertical axis indicates time taken to perform the entire workload in units of seconds.

It can be seen from FIG. 7 that, when page replacement is performed only using a hard disk (710, 720, and 730), processing speed is significantly lower than when an RAM or an SSD extended buffer is used. As can be seen, when the SSD extended buffer is used, the number of page input/output operations decreases as the size of the SSD extended buffer increases, such that test time gradually decreases.

In comparison to the graphs 750 and 760 showing processing speeds when the conventional 2Q page replacement algorithm and LRU page replacement algorithm are used together with the SSD extended buffer, the graph 770 using the LRU-K page replacement algorithm together with the SSD extended buffer, which is a graph according to an embodiment of the present invention, has superior processing speed. That is, the LRU-K algorithm using the SSD based on the present invention as the extended buffer shows improvement in data processing speed when compared to conventional page replacement policies.

FIG. 8 is a simplified flowchart of a method for implementing an LRU-K page replacement algorithm using an SSD extended buffer, according to an embodiment of the present invention.

Referring to FIG. 8, it is determined whether in the main memory device, there is a buffer space into which a reference page is to be inserted, in operation 810. If the reference page exists in the LRU-K list or the first priority queue included in the main memory device, it may be directly referred to in operation 850.

Otherwise, if there is no reference page in either the LRU-K list included in or the first priority queue included in the main memory device, it is determined whether a page having no last-preceding reference time information (second reference time information) exists in the LRU-K list, and if so, that page is moved down to and recorded in the SSD extended buffer; in detail, if there is any page having no last-preceding reference time information (second reference time information) in the LRU-K list, a page having the oldest second reference time information among pages having second reference time information in the first priority queue is moved down to and recorded in the SSD extended buffer and the reference page is inserted into the empty buffer space in operation 820.

That is, if in the buffer of the main memory device, there is no buffer space for insertion of the reference page thereinto, at least one of the page having no second reference time information included in the LRU-K list and the page having the oldest second reference time information among the pages having second reference time information included in the first priority queue is moved to and recorded in the SSD extended buffer, and the reference page may be recorded and referred to in a space left after the corresponding page is pushed, in operations 840 and 850.

If there is no empty buffer space in the SSD extended buffer for recording pages pushed from the main memory device due to the pages pushed to the SSD extended buffer, a cold page having no second reference time information is first moved down to the auxiliary memory device, and a page having second reference time information is given at least one chance to be maintained in the SSD extended buffer in operation 830.

Operations 830, 840, and 850 are described as being sequentially performed for convenience's sake, but they may be sequentially performed in that order, or according to circumstances, operations 840 and 850 are performed first in the stated order, and then operation 830 may be performed. That is, those operations may not be sequentially performed without departing from the essence of the present invention.

By performing a method of managing a buffer cache, according to an embodiment of the present invention, when a page having last-preceding reference time information is pushed due to a page replacement policy using the LRU-K algorithm, it is given an additional chance to be maintained in the extended buffer, instead of being directly moved down to the auxiliary memory device, such as a hard disk, like a page having no last-preceding reference time information. As a result, pages having last-preceding reference time information are referred to from the extended buffer rather than the hard disk, thereby increasing the page input/output speed through reduction of write/read operations with respect to the hard disk.

In an embodiment, instructions and data corresponding to the processes described herein are stored in a non-transitory computer-readable storage medium such as a hard drive, CD-ROM, DVD, or a solid-state memory device. The instructions are configured to cause a processor to perform the processes or methods described herein. In an embodiment, the instructions are stored as a computer program module, for example, a cache manager module configured to perform the processes described herein. As used herein, the term "module" refers to computer program logic used to provide the specified functionality. Thus, a module can be implemented in hardware, firmware, and/or software. In one embodiment, program modules are stored on a storage device of a computer, loaded into the memory of the computer, and executed by the processor of the computer.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A computer-implemented method of managing a buffer cache to perform page replacement by using reference time information regarding a time at which a page is referred to, the method comprising:
   loading a reference page to be referred to according to a request in a main memory;
   a first page selecting operation of, responsive to a space for loading the reference page being insufficient in the main memory:
      selecting at least one first page based on reference time information of pages loaded in the main memory,
      recording the selected first page in an extended buffer, and
      overwriting the reference page in a space where the selected first page has existed in the main memory; and
   a second page selecting operation of, responsive to a space for recording the selected first page being insufficient in the extended buffer,
      selecting at least one second page based on reference time information of pages recorded in the extended buffer,
      recording the selected second page in an auxiliary memory, and
      overwriting the reference page in a space where the selected second page has existed in the extended buffer.

2. The method of claim 1, wherein the first page selecting operation comprises selecting as the first page, among pages loaded in the main memory, at least one page which has the oldest last-preceding reference time or which has no last-preceding reference time information.

3. The method of claim 1, wherein the second page selecting operation comprises selecting as the second page, among pages recorded in the extended buffer, at least one page having no last-preceding reference time information.

4. The method of claim 1, wherein the extended buffer is implemented with a solid state disk (SSD).

5. The method of claim 1, wherein the main memory comprises a least recently used (LRU)-K list, a first priority queue, and a second priority queue, and replaces a page according to an LRU-K algorithm.

6. The method of claim 5, wherein the first page selecting operation comprises:
   selecting as the first page, among pages included in the LRU-K list, a page having no last-preceding reference time information, and inserting the reference page into the LRU-K list; and
   responsive to determining that all pages in the LRU-K list have a last-preceding time information, selecting as the first page, among pages included in the first priority queue, a page having the oldest last-preceding reference time, and inserting the reference page into the first priority queue.

7. The method of claim 5, wherein the loading operation comprises:
   searching the LRU-K list to determine whether the reference page is included in the LRU-K list;
   responsive to the reference page not being included in the LRU-K list, searching the first priority queue to determine whether the reference page is included in the first priority queue; and
   responsive to the reference page not being included in the first priority queue, searching the extended buffer to determine whether the reference page is recorded in the extended buffer.

8. An apparatus for managing a buffer cache by using reference time information regarding a time at which a page is referred to, the apparatus comprising:
   a main memory for loading a reference page to be referred to according to a request in a main memory;
   an extended buffer for, if a space for loading the reference page is insufficient in the main memory, recording at least one page having the oldest last-preceding reference time or having no last-preceding reference time information among pages loaded in the main memory.

9. The apparatus of claim 8, further comprising an auxiliary memory for, if a space for recording the selected first page is insufficient in the extended buffer, recording at least one page having no last-preceding reference time information among pages recorded in the extended buffer.

10. The apparatus of claim 8, wherein the extended buffer is a Solid State Disk (SSD).

11. The apparatus of claim 8, wherein the main memory comprises a least recently used (LRU)-K list, a first priority queue, and a second priority queue, and replaces a page according to an LRU-K algorithm.

12. The apparatus of claim 11, wherein if there is a page having no last-preceding reference time information in the LRU-K list, the main memory moves the page having no last-preceding reference time information to the extended buffer and inserts the reference page to the LRU-K list, and
responsive to determining that all pages in the LRU-K list have a last-preceding reference time information, the main memory moves a page having the oldest last-preceding reference time among pages included in the first priority queue to the extended buffer and inserts the reference page to the first priority queue.

13. The apparatus of claim 11, wherein the apparatus searches the LRU-K list to determine whether the reference page is included in the LRU-K list,
responsive to the reference page not being included in the LRU-K list, searches the first priority queue to determine whether the reference page is included in the first priority queue; and
responsive to the reference page not being included in the first priority queue, searches the extended buffer to determine whether the reference page is recorded in the extended buffer.

14. A non-transitory computer readable storage medium storing a computer program product including computer instructions configured to cause a processor of a computer to perform a computer-implemented method of managing a buffer cache to perform page replacement by using reference time information regarding a time at which a page is referred to, the method comprising:
loading a reference page to be referred to according to a request in a main memory;
a first page selecting operation of, responsive to a space for loading the reference page being insufficient in the main memory:
selecting at least one first page based on reference time information of pages loaded in the main memory,
recording the selected first page in an extended buffer, and
overwriting the reference page in a space where the selected first page has existed in the main memory; and
a second page selecting operation of, responsive to a space for recording the selected first page being insufficient in the extended buffer,
selecting at least one second page based on reference time information of pages recorded in the extended buffer,
recording the selected second page in an auxiliary memory, and
overwriting the reference page in a space where the selected second page has existed in the extended buffer.

15. The non-transitory computer readable storage medium of claim 14, wherein the first page selecting operation comprises selecting as the first page, among pages loaded in the main memory, at least one page which has the oldest last-preceding reference time or which has no last-preceding reference time information.

16. The non-transitory computer readable storage medium of claim 14, wherein the second page selecting operation comprises selecting as the second page, among pages recorded in the extended buffer, at least one page having no last-preceding reference time information.

17. The non-transitory computer readable storage medium of claim 14, wherein the extended buffer is implemented with a solid state disk (SSD).

18. The non-transitory computer readable storage medium of claim 14, wherein the main memory comprises a least recently used (LRU)-K list, a first priority queue, and a second priority queue, and replaces a page according to an LRU-K algorithm.

19. The non-transitory computer readable storage medium of claim 18, wherein the first page selecting operation comprises:
selecting as the first page, among pages included in the LRU-K list, a page having no last-preceding reference time information, and inserting the reference page into the LRU-K list; and
responsive to determining that all pages in the LRU-K list have a last-preceding time information, selecting as the first page, among pages included in the first priority queue, a page having the oldest last-preceding reference time, and inserting the reference page into the first priority queue.

20. The non-transitory computer readable storage medium of claim 18, wherein the loading operation comprises:
searching the LRU-K list to determine whether the reference page is included in the LRU-K list;
responsive to the reference page being not included in the LRU-K list, searching the first priority queue to determine whether the reference page is included in the first priority queue; and
responsive to the reference page being not included in the first priority queue, searching the extended buffer to determine whether the reference page is recorded in the extended buffer.

* * * * *